United States Patent [19]

Cidon et al.

[11] Patent Number: 5,309,433
[45] Date of Patent: May 3, 1994

[54] METHODS AND APPARATUS FOR ROUTING PACKETS IN PACKET TRANSMISSION NETWORKS

[75] Inventors: Israel Cidon, Haifa, Israel; David W. Davenport, Raleigh, N.C.; Jeffrey H. Derby, Chapel Hill, N.C.; John G. Dudley, Raleigh, N.C.; Inder S. Gopal, Fort Lee, N.J.; James P. Janniello, Stamford, Conn.; Marc A. Kaplan, Katonah, N.Y.; Francis R. Koperda, Raleigh, N.C.; Shay Kutten, Rockaway, N.J.; Kenneth H. Potter, Jr., Raleigh, N.C.

[73] Assignee: International Business Machines Corp., Armonk, N.Y.

[21] Appl. No.: 900,635

[22] Filed: Jun. 18, 1992

[51] Int. Cl.⁵ .................. H04J 3/26; H04L 12/56
[52] U.S. Cl. ........................ 370/60; 370/94.1
[58] Field of Search ............. 370/60, 60.1, 94.1, 370/94.2, 94.3, 54; 340/825.02, 825.52

[56] References Cited

U.S. PATENT DOCUMENTS

| | | | |
|---|---|---|---|
| 4,811,337 | 3/1989 | Hart | 370/85.13 |
| 4,827,411 | 5/1989 | Arrowwood et al. | 364/300 |
| 4,864,559 | 9/1989 | Perlman | 370/94.3 X |
| 5,144,622 | 9/1992 | Takiyasu et al. | 370/94.1 X |

OTHER PUBLICATIONS

"Multicast Routing in Datagram Internetworks," S. E. Deering and D. R. Cheriton, ACM Transactions on Computer Systems, vol. 8, No. 2, May 1990, pp. 85-110.
"Multipoint Connection Management in High Speed Networks," R. Bubenik, J. DeHart and M. Gaddis, Proceedings of the IEEE INFOCOM '91, Apr. 1991, pp. 59-68.
"Multicast Service on High-Speed Interconnected LANs," L. Strigine, L. Fratta and A. Albanese, Proceedings of the IFIP TC 6, Amsterdam, Netherlands: North Holland, Feb. 1987, pp. 173-176.
"Distributed Control for PARIS," B. Awerbuch, I. Cidon, I. S. Gopal, M. Kaplan and S. Kutton, Proceedings of the 9th ACM Symposium on Principles of Distributed Computing, Quebec, Canada, Aug. 1990, pp. 145-159.
"PARIS: An Approach to Integrated High-Speed Private Networks," I. Cidon and I. Gopal, International Journal of Digital and Analog Cabled Systems 1, pp. 77-85, vol. 1, No. 1, Apr.-Jun. 1988.

Primary Examiner—Douglas W. Olms
Assistant Examiner—Melvin Marcelo
Attorney, Agent, or Firm—Gerald R. Woods

[57] ABSTRACT

A packet communications system provides for point-to-point packet routing and multicast packet routing to limited subsets of nodes in the network, using a routing field in the packet header which is processed according to two different protocols. A third protocol is provided in which a packet can be multicast to the limited subset even when launched from a node which is not a member of the subset. The routing field includes a first portion which contains the route labels necessary to deliver the packet to the multicast subset. A second portion of the routing field contains the multicast subset identifier which can then be used to deliver the packet to all of the members of the multicast subset. Provision is made to backtrack deliver the packet to the last node identified before the multicast subset if that last node is itself a member of the subset.

12 Claims, 5 Drawing Sheets

PACKET COMMUNICATIONS NETWORK (PRIOR ART)

TYPICAL PACKET DECISON POINT (PRIOR ART)

NETWORK LAYER HEADER (PRIOR ART)

AUTOMATIC NETWORK ROUTING FIELD (PRIOR ART)

TREE MULTICAST MODE ROUTING FIELD (PRIOR ART)

REMOTE ACCESS TO MULTICAST TREE ROUTING FIELD

MULTICAST TREE IN PACKET COMMUNICATIONS NETWORK

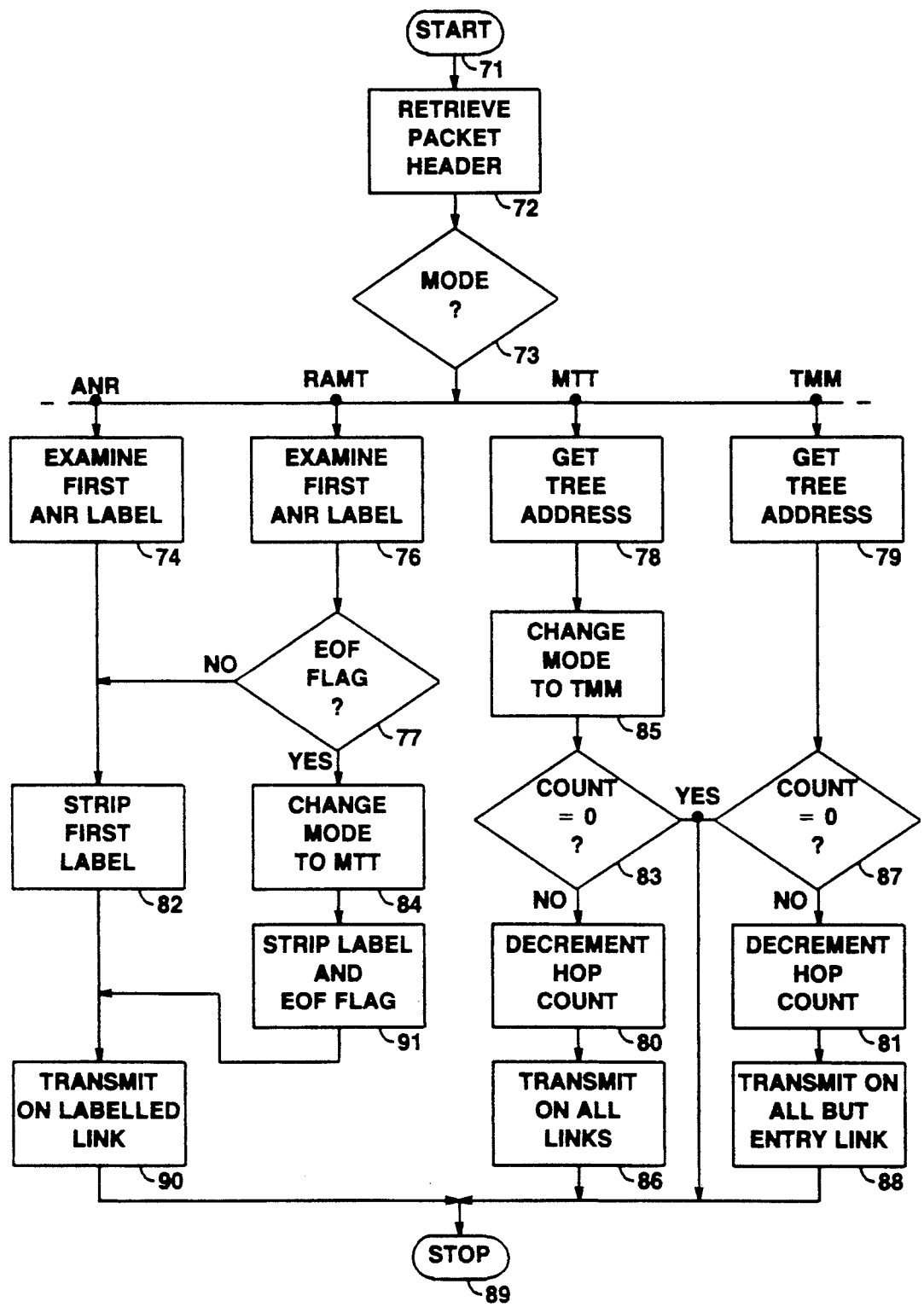

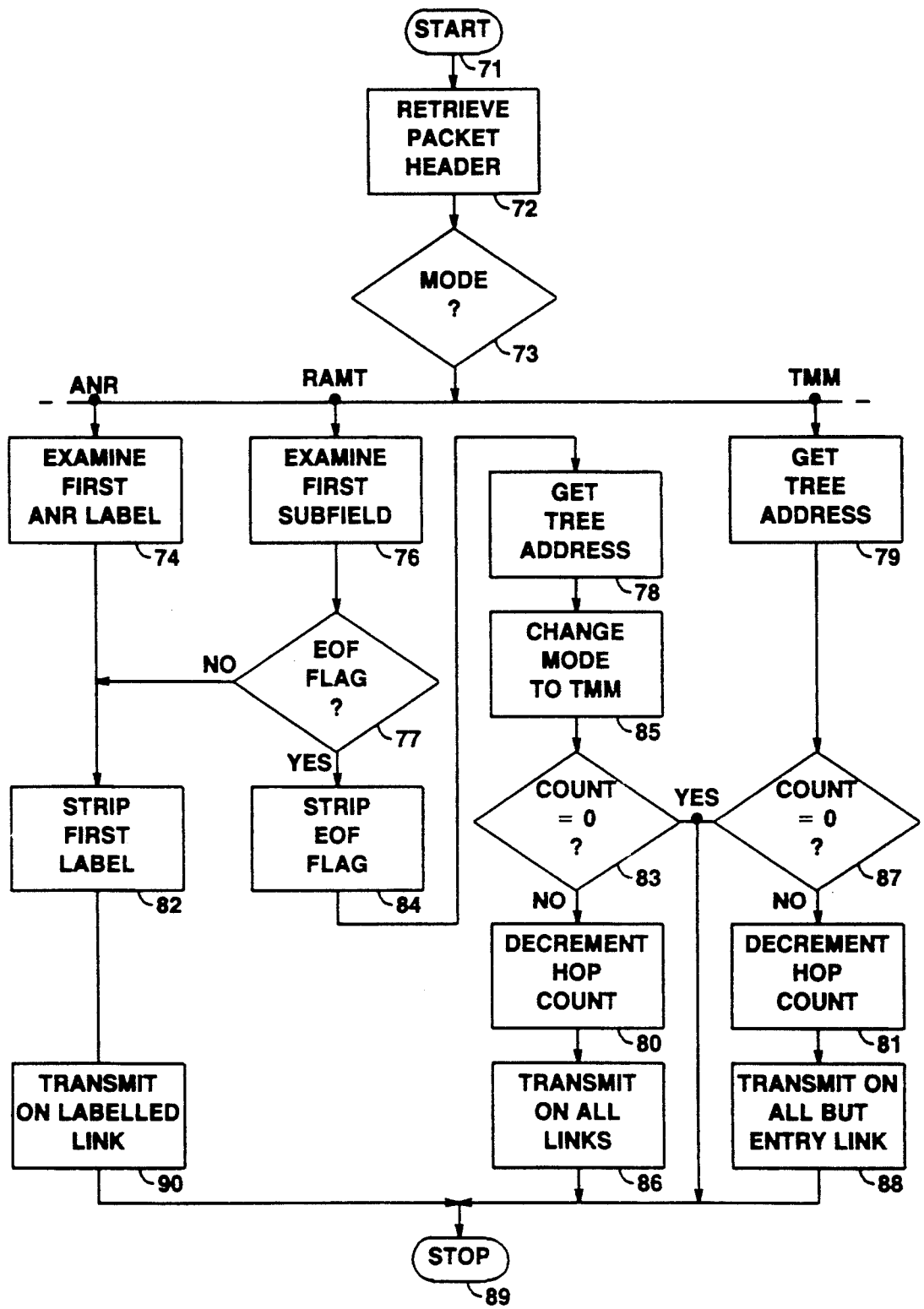

METHODS AND APPARATUS FOR ROUTING PACKETS IN PACKET TRANSMISSION NETWORKS

TECHNICAL FIELD

This invention relates to packet transmission systems and, more particularly, to the routing of data packets in such transmission systems.

BACKGROUND OF THE INVENTION

In high speed packet transmission networks, routing of packets through the network is accomplished by means of routing information in the packet header. Such a network is composed of nodes interconnected by transmission links. Nodes include packet switching mechanisms for selectively launching received packets on outgoing transmission links. Some of these nodes are called end nodes and provide user access to the network. When analyzed as a graph, such networks can be characterized as a graph of switches, user stations, and the edges connecting them together. Edges connecting switches together correspond to the transmission links interconnecting such switching mechanisms. Edges connecting user stations (user applications) to the network at end nodes are called terminal edges. Adapter circuits at each of the switching mechanisms adapt the packet signals for transmission on or delivery to the transmission links and user applications, respectively. Many different types of packet switching mechanisms and transmission links can be accommodated in such packet transmission systems.

Routing information for such networks can be expressed in many different forms, two major modes of which are called Automatic Network Routing (ANR), used to deliver a packet to a single destination user station, and Tree Multicast Mode (TMM), used to deliver the same packet to a plurality of destination user stations. In ANR routing, the successive links in the route are specified, in routing order, by transmission link labels in the routing field. Along the route, as the packet is switched to a new link, that link label is stripped away from the routing field to leave the next-to-be-used link label as the first label in the routing field. Automatic Network Routing is described in "PARIS: An Approach to Integrated High-Speed Networks" by I. Cidon and I. S. Gopal, *International Journal of Digital and Analog Cabled Systems*, Vol. 1, No. 2, April–June, 1988, pages 77–85.

In TMM routing, multicast trees are predefined to connect a desired subset of user stations connected to the packet transmission network. In this connection, a "tree" is defined as a connected set of switches, packet user stations, and edges having no cycles or loops. The term "multicast" is defined as a single sender transmitting packets to a multiplicity of receiving user stations. The multicast tree is identified in the routing field by a tree address. Rather than stripping the tree address from the routing field, this address is used at each switching point in the tree to route the packet to all other connected switches or user stations of the same tree (except the switch or user station from which the packet was received). In this way, any user station of a multicast tree can launch a packet with the tree address in the routing field and have that packet delivered to all of the other user stations of the same multicast tree. Such multicast tree routing is described in "Distributed Control for PARIS," by B. Awerbuch, I. Cidon, I. Gopal, M. Kaplan and S. Kutten, *Proceedings of the 9th ACM Symposium on Principles of Distributed Computing*, Quebec, Canada, August, 1990, pages 145–159.

Due to the differing protocols for processing the routing field to provide ANR and TMM routing, it has heretofore been impossible to mix these two types of routing in the same packet header. It is often desirable, however, to deliver a packet to all of the user stations of a multicast tree from an originating user station which is not itself a member of the multicast tree. For example, a plurality of adapters may be connected to a particular Local Area Network (LAN). One such local LAN adapter may wish to send a request to a remote group of LAN adapters which are associated with a second LAN and connected by a multicast tree for information about the stations of than second LAN. Similarly, an end node may wish to simultaneously send a query to a group of directory service providers which have been, for update convenience, connected by a multicast tree. A significant problem, then, is to allow such remote access to multicast trees.

SUMMARY OF THE INVENTION

In accordance with the illustrative embodiment of the present invention, Automatic Network Routing labels and the Tree Multicast Mode tree address are concatenated in the routing field of a packet. The ANR labels are used to direct a packet to one network node of a particular multicast tree. The TMM address is then used to direct the packet to all of the end nodes of the multicast tree.

More particularly, a new mode of routing is defined as "Remote Access to Multicast Tree" (RAMT) in which ANR labels make up the initial portion of the routing field and a multicast tree address makes up the terminating portion of the routing field, separated by a preselected delimiter. The tree portion is therefore not examined until the ANR portion is fully exhausted and stripped away. At that time, the packet should be at a network node of the target multicast tree and the tree address can be used effectively to deliver the packet to all of the members of the multicast tree.

In accordance with one feature of the present invention, provision is made for the case in which the link over which the packet is delivered to the entry network node of the multicast tree is itself a member of the multicast tree. Normally, a multicast tree packet is not sent back over the same link on which it is received at the switching point. However, in the RAMT protocol, the packet arrived at the entry network node due to an ANR label, and not due to the tree address. To accommodate this situation, a transitory routing mode called the "Multicast Tree Transition" (MTT) mode is defined in which a received packet is retransmitted over *all* transmission links of a multicast tree, possibly including the link over which the packet was received. The routing mode is, of course, changed to the standard multicast tree mode when forwarded to such nodes of the multicast tree.

Alternatively, the last ANR routing label can be stripped by the node launching the packet to the entry node of the multicast tree, but leaving the delimiter in place and not changing the routing mode. The receiving entry node will change the mode to TMM mode, remove the delimiter and then route the packet over all links of the tree, possibly including the link over which the packet arrived.

BRIEF DESCRIPTION OF THE DRAWINGS

A complete understanding of the present invention may be gained by considering the following detailed description in conjunction with the accompanying drawings, in which:

FIG. 8 shows a flow chart of one set of packet routing protocols for the packet network of FIG. 1 using the routing fields of FIGS. 3-6 and using a Multicast Tree Transition mode protocol; and FIG. 9 shows a flow chart of another set of packet routing protocols for the packet network of FIG. 1 using the routing fields of FIGS. 3-6 and not requiring any transitional mode protocol at the entry to the multicast tree.

To facilitate reader understanding, identical reference numerals are used to designate elements common to the figures.

DETAILED DESCRIPTION

Figure 1:
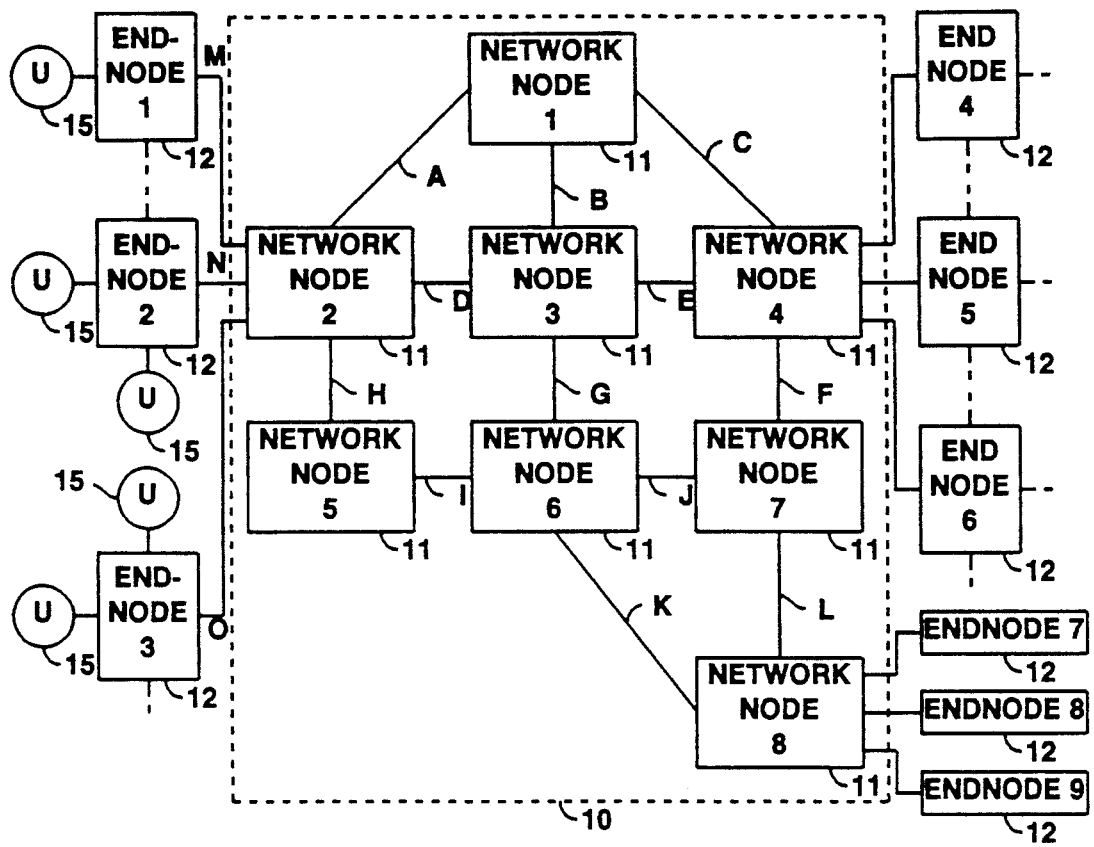
FIG. 1 shows a general block diagram of a packet communications system in which the routing techniques of the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 4 being shown as attached to end nodes 4, 5 and 6, and network node 8 being attached to end nodes 7, 8 and 9. Network nodes 11 each comprise a data processing system which provides data communications services to all connected nodes, network nodes and end nodes. The network nodes 11 each include a decision point within the node, at which incoming data packets are selectively routed on one or more of the outgoing communications links terminated at another node. Such routing decisions are made in response to information in the header of the data packet, to be described more fully hereinafter. In addition to the basic packet routing function, the network nodes 11 also provide ancillary services such as calculating routing paths for packets originated in the node, directory services, and maintenance of network topology databases which are used to support the routing calculations. The following description will be concerned only with those functions of the network and end nodes which are involved in carrying out the routing function in response to routing information in the header of each received packet.

Each of end nodes 12 is connected by way of an adapter circuit to each of a plurality of user stations 15. Each of user stations 15 comprises either a source of digital data to be transmitted to another user station, a data sink for consuming digital data received from another user station, or, typically, both. User stations use the packet communications network 10 of FIG. 1 by connecting to an end node 12 connected to one of the network nodes 11 for access to the packet network 10. The end nodes 12 translate the user's data into packets formatted appropriately for transmission on the packet network of FIG. 1 and generate the headers which are used to route the packets through the network 10. The header has the general form shown in FIG. 3 and includes two control bytes 34 and 31, a routing field 32 and a redundancy check byte 33. The routing field 32 contains the information necessary to route the packet through the packet network 10 to the destination end node 12 to which it is addressed. The control bytes 31 and 34 include, among other things, an encoded identification of the protocol to be used in interpreting the routing field 32, as will be described below. End nodes 7, 8 and 9 obviously are also each attached to one or more user stations, not shown in FIG. 1.

Figure 2:
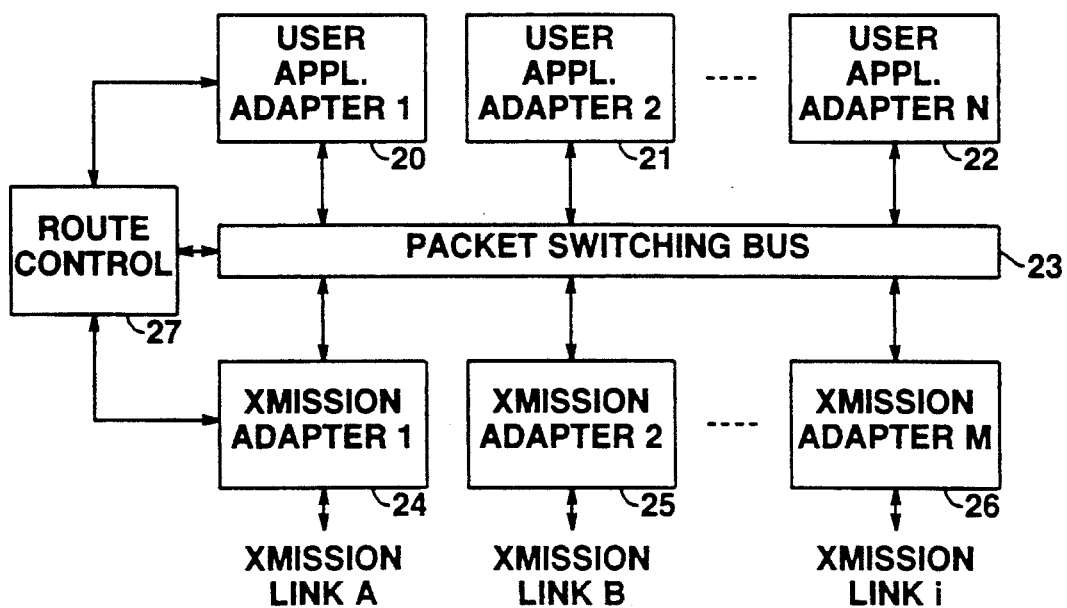
FIG. 2 shows a general block diagram of a typical packet network decision point of the communications system of FIG. 1.

In FIG. 2 there is shown a general block diagram of a typical packet decision point such as is found in the network nodes 11 or the end nodes 12 of FIG. 1. The decision point of FIG. 2 comprises a high speed packet switching bus 23 onto which packets arriving at the decision point are entered. Such packets arrive over transmission links via transmission adapters 24, 25, ..., 26, or originate in user applications, corresponding to user stations 15 of FIG. 1, in end nodes via application adapters 20, 21, ..., 22. Using information in the packet header, others of the adapters 20-22 and 24-26 determine which packets launched on bus 23 are to be routed to the user application or the transmission link attached to the adapter. The decision point of FIG. 2 thus serves to connect the packets arriving at the decision point to a local user (for end nodes) or to a transmission link leaving the decision point (for network nodes and end nodes). The adapters 20-22 and 24-26 may include queuing circuits for queuing packets prior to or subsequent to switching on bus 23. Route control circuits 27 are used to calculate optimum routes through the network of FIG. 1 so as to minimize the amount of network resources used to complete a communication path.

The route control circuit 27 of FIG. 2 may comprise discrete digital circuitry or may preferably comprise properly programmed digital computer circuits. Such a programmed computer can be used to generate headers for packets originating at user applications in the decision point of FIG. 2. Finally, the data bases necessary to support the calculation of optimum routes for packets originating at the decision point, not shown in FIG. 2, are also included in the decision point. Such network topology databases include all of the necessary information about the nodes and transmission links connected to the nodes which is to be used for routing. Moreover, such topology information is updated when new links are activated or new nodes added to the network. Such network topology information is exchanged with all other node topology databases to provide the necessary up-to-date information needed for route calculation. Such database updates are carried on packets very similar to the data packets between end users of the network.

The incoming transmission links to the packet decision point of FIG. 2 may comprise links from local end nodes such as end nodes 12 of FIG. 1, or links from adjacent network nodes 11 of FIG. 1. In any case, the decision point of FIG. 2 operates in the same fashion to receive each data packet and forward it on to another decision point as dictated by the information in the packet header. The packet network of FIG. 1 thus operates to enable communication between any two user stations 15 of FIG. 1 without dedicating any transmission or node facilities to that communication path except for the duration of a single packet. In this way, the utilization of the communication facilities of the packet network is optimized to carry significantly more traffic than would be possible with dedicated transmission links for each communication path.

Figure 3:
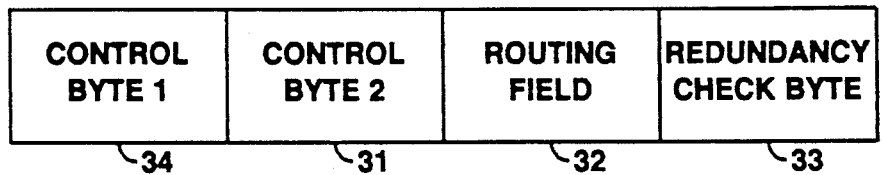
FIG. 3 shows a graphical representation of a typical header for the packet transmitted in the transmissions system shown in FIG. 1.

As previously noted, FIG. 3 shows a graphical representation of the network layer header for packets transmitted on the packet network of FIG. 1. The network layer provides the services necessary to route packets across the packet network by directing the packets from node to node using appropriate transmission links. In addition, the network layer may discard packets if errors occur in the packet header or if a buffer overflows. When buffer congestion occurs, the network layer implements a packet discard policy based on the loss priority, i.e., lower priority packets are discarded first. The network layer also implements a scheduling policy based on the delay priority, i.e., higher priority packets are transmitted first. Since these packet discard and packet scheduling policies form no part of the present invention, they will not be further described here.

The header of FIG. 3 comprises four different fields including control bytes 34 and 31, routing field 32 and redundancy check byte 33. Control byte 34 includes binary bits used to encode the routing mode. As previously noted, these modes include an Automatic Network Routing (ANR) mode and a Tree Multicast Mode (TMM). In accordance with the present invention, these modes also include a Remote Access to Multicast Tree (RAMT) mode and a Multicast Tree Transition (MTT) mode. These latter two modes will be discussed in detail hereinafter. Other mode codes are possible but are of no interest to the present invention and will not be further discussed here.

The second control byte 31 of the header of FIG. 3 is used to encode packet copy identification modes, end-to-end transport connection control, and a generic extension code. None of these codes are of interest in connection with the present invention and will not be further discussed here.

Figure 4:
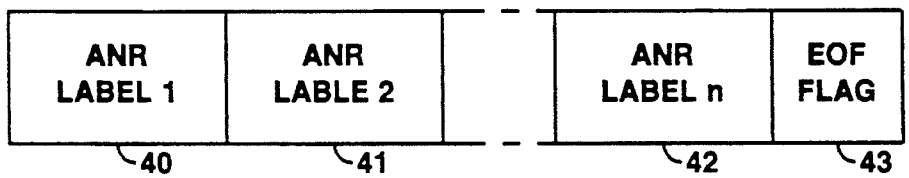
FIG. 4 shows a graphical representation of an Automatic Network Routing field in the header of FIG. 3.
Figure 5:
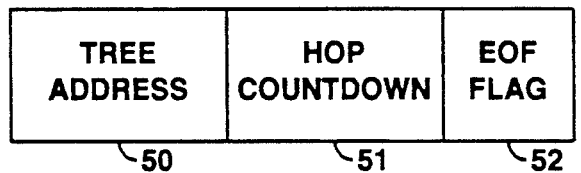
FIG. 5 shows a graphical representation of a Multicast Tree Routing field or of a Multicast Tree Transition Routing field in the header of FIG. 3.
Figure 6:
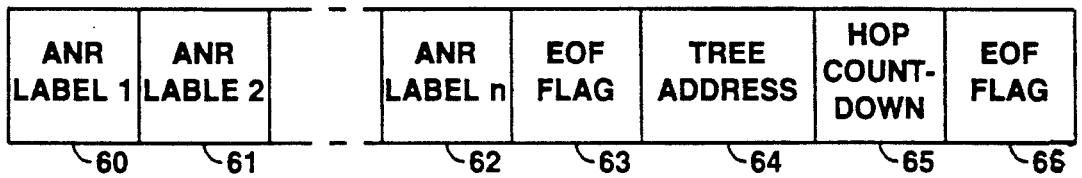
FIG. 6 shows a graphical representation of a Remote Access to Multicast Tree routing field in accordance with the present invention.

Returning to FIG. 3, the redundancy check byte 33 is a check sum for the network layer header of FIG. 3 and is used to check for errors in the header itself. If an error is detected in the header, the packet is discarded. The routing field 32 of FIG. 3 can take on several different formats, depending on the routing mode specified in control byte 34. Three of these routing field formats are shown in FIGS. 4, 5 and 6, corresponding to the Automatic Network Routing (ANR) mode (FIG. 4), the Tree Multicast Mode routing (TMM) mode (FIG. 5) and the Remote Access to Multicast Routing (RAMR) mode (FIG. 6). The routing field of FIG. 5 is also used for the Multicast Tree Transition (MTT) mode.

In FIG. 4, a graphical representation of a typical Automatic Network Routing (ANR) field is shown comprising a plurality of transmission link labels 40, 41, ..., 42, followed by an end-of-field flag 43. The link labels 40-42 each identify one transmission link in the communications path between the source of the packet and the destination of the packet, the last label corresponding to the terminal edge connecting to the destination user station 15 (FIG. 1). Moreover, these link labels are in exactly the same sequence as the sequence in which the transmission links are to be traversed in reaching the destination. The next-to-last link label identifies the transmission link to the destination end node, to which the packet is to be delivered. A routing decision point, then, is a switching point requiring the use of one link label in order to forward the packet to the next decision point. Indeed, the link label is used to control the actual switching at the decision point. Note that the transmission links of FIG. 1 are bidirectional in that they provide transmission capacity in both directions between the interconnected nodes. A separate link label is therefore provided for each direction of transmission and such link labels are totally unrelated to link labels at other nodes, even when sharing the same transmission facility.

As a packet flows through the packet network of FIG. 1, the ANR labels in fields 40-42 of FIG. 4 are stripped away by the adapter circuits that copy the packet from the switching bus 23 of FIG. 2. The first label within the ANR routing field is therefore always the label for the edge to be selected at the next routing decision point. Each decision point therefore need only consider the first label of the ANR routing field in selectively routing the packet from that decision point. A more detailed description of Automatic Network Routing can be found in the afore-mentioned article by I. Cidon et al.

Figure 7:
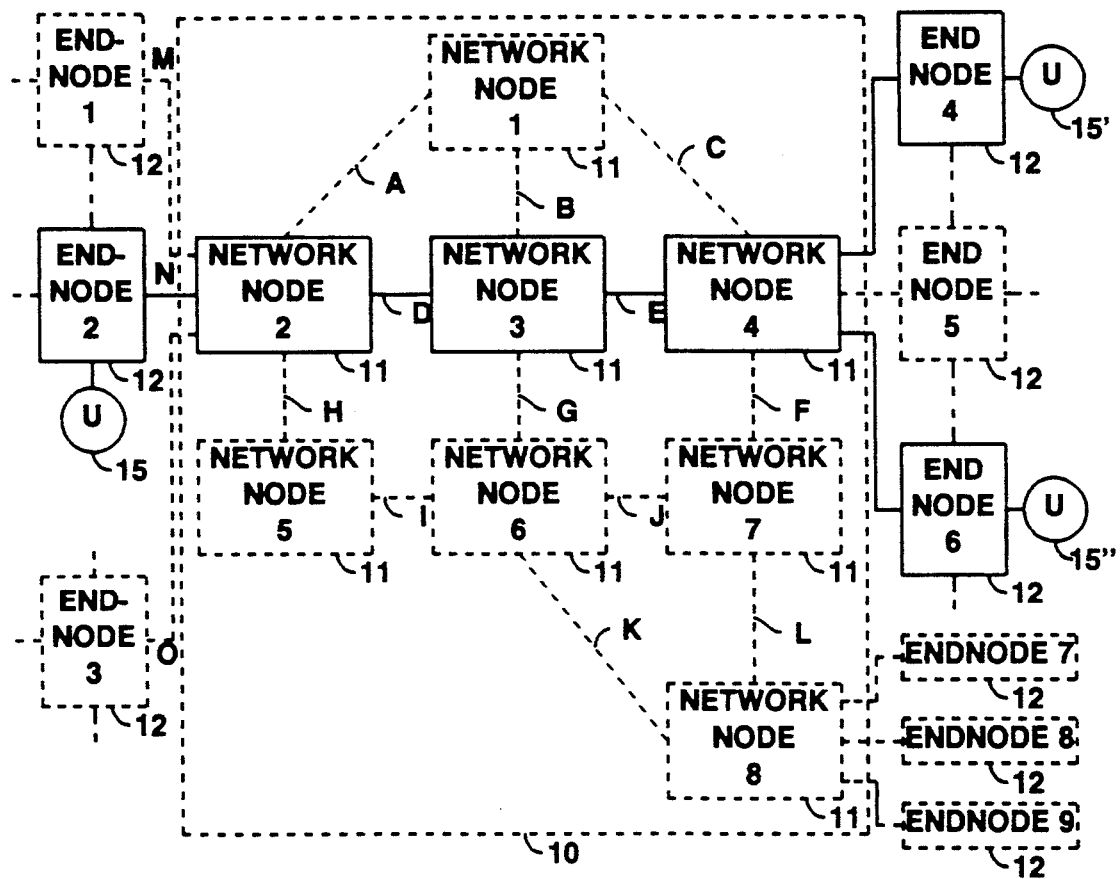
FIG. 7 shows a general block diagram of the packet communications system of FIG. 1 in which a typical multicast tree is shown in solid lines and the balance of the system is shown in dashed lines.

In FIG. 5 there is shown a graphical representation of the routing field user for the Tree Multicast Mode (TMM) routing. Multicasting means delivering the same packet to a plurality of different destination user stations from the same originating user station. The members of the group of different destinations which are to receive such common packet transmissions are associated together in a multicast tree. The adapter circuits at each link in the tree is marked with the same tree address which is found in the tree address field 50 of the TMM field of FIG. 5. As an example, a typical multicast tree is shown in FIG. 7 in solid lines while the nodes and links which are not part of the tree are shown with dashed lines. Otherwise, the packet network of FIG. 7 is identical to the packet network of FIG. 1.

The address of the multicast tree is set up at the same time that the multicast tree itself is created. Furthermore, the tree address is not modified or removed (as are the ANR labels in ANR routing) as the packet moves through the packet network of FIG. 1. At each decision point encountered by the packet with a multicast tree address, the packet is copied, by the adapters 20-22 or 24-26, for every outgoing link sharing that tree address, except the link over which the packet arrived. The duplicate packets are transmitted to all adjacent nodes of the multicast tree where the duplication and retransmission are continued until no outgoing links share the multicast tree address. To prevent duplicate delivery of the same packet, the multicast tree is created without loops, permitting only one path between any two decision points, even under network failure conditions. As shown in FIG. 5, a hop countdown field 51 is included in the TMM field which is decremented at each retransmission of the packet. When the hop countdown field is equal to zero, no further retransmission is permitted and an error condition is assumed. The TMM field of FIG. 5 is terminated by an end-of-field flag 52.

To send a packet to all other members of a multicast tree, an originating end node in the tree includes the TMM identifying code in control byte 34 (FIG. 3) and, in the routing field, the appropriate tree address which identifies the group. All end nodes which are members of the multicast tree will receive a copy of the packet. Any node can simultaneously be a member of a plurality of different multicast trees and hence the tree addresses assigned to overlapping multicast trees must be unique. Nodes can be added or deleted from a multicast tree simply by adding or removing the tree address from the links leading to the node to be added or deleted. A more detailed description of the multicast tree routing mode for packet networks is disclosed in the aforementioned article by B. Awerbuch et al.

In accordance with the illustrative embodiment of the present invention, a hybrid type of packet network routing is provided called the Remote Access to Multicast Tree (RAMT) routing mode. This routing mode permits a packet to be delivered to all of the members of a multicast tree from an originating user station connected to an end node which is not itself a member (destination) of the multicast tree. It is the combination of ANR and Multicast Tree routing which can be used for many applications such as those mentioned above.

The routing field for the RAMT routing mode is shown in FIG. 6. The RAMT field consists of a series of ANR labels 60, 61, . . . , 62, followed by an end-of-field flag 63, in turn followed by a tree address 64, a hop count 65 and a second end-of-field flag 66. The next-to-last routing decision point in the path defined by the ANR routing labels 60-62 utilizes the last ANR label from the field to launch the packet toward an entry node of the multicast tree. The entry node decision point is on the multicast tree and can use the multicast tree address for further routing of the packet.

Normally, as discussed above, a multicast tree packet is not sent back over the same link over which it arrived at a decision point. However, in the case of Remote Access to Multicast Tree routing, the packet has arrived at the decision point due to the last ANR label and not as a result of the tree address. A Multicast Tree Transition routing mode can therefore be used to permit the multicast packet to be sent back on the link over which it arrived, if that link is part of the multicast tree. This allows the remote access packet to be delivered to the multicast tree over links which are themselves part of the multicast tree. Route computation can therefore be made independently of the multicast tree memberships, simplifying the route calculation algorithms. The routing mode is changed at the entry node of the multicast tree to normal Tree Multicast Mode routing (TMM) to permit appropriate distribution to the balance of the multicast tree.

As previously noted, FIG. 7 shows a typical multicast tree (in solid lines) imposed on the packet communications system of FIG. 1. Note that end nodes 2, 4 and 6 are interconnected by the tree of FIG. 7. It is to be noted that other subsets of the end nodes of FIG. 7 could be interconnected by other multicast trees and, indeed, each end node may well participate in more than one such tree. In any event, the purpose of the multicast tree is to provide a convenient and efficient mechanism for exchanging messages among the members of the tree by providing a simple and efficient routing mechanism.

The procedures described in connection with FIGS. 4-6 above can be represented by the flow chart of FIG. 8. Starting at box 71, box 72 is entered where the packet switch examines the packet header (FIG. 3) from a packet received over one of the edges attached to the switch. In decision box 73, the control byte 34 (FIG. 3) is examined to determine the routing mode. Only the routing modes "ANR," "RAMT," "MTT," and "TMM" are implemented in the flow chart of FIG. 8. ANR is the Automatic Network Routing mode in which the link labels, as shown in FIG. 4, are stripped away one at a time and used to select the next transmission link. TMM is the Tree Multicast Mode in which a tree address, as shown in FIG. 5, is used to select all outgoing transmission links belonging to the addressed tree, except the entry link. RAMT is the Remote Access to Multicast Tree Routing mode forming the subject matter of the present invention and utilizing the initial portion of the routing field for ANR link labels and the latter part of the routing field to identify a multicast tree, as show in FIG. 6. Finally, MTT is the Multicast Tree Transition mode encoded in the header by the next to last switch associated with the ANR path and used only in the last switch of the path, which is also the entry switch of a multicast tree accessed by the RAMT routing mode.

Returning to FIG. 8, the ANR routing mode causes box 74 to be entered where the first ANR label from the routing field is examined. This first label is stripped from the routing field in box 82 and, in box 90, the packet is passed over the edge identified by the label previously examined in box 74. The process then stops in terminal box 89 until the next packet arrives for processing.

If the TMM (Tree Multicast Mode) mode is detected in decision box 73, box 79 is entered to obtain the tree address 50 from the routing field of FIG. 5. Decision box 87 is then entered to determine if the hop count has been decremented to zero. A zero hop count indicates that the packet has been forwarded just enough times as is required to service the entire multicast tree. Terminal box 89 is therefore entered directly to terminate the route processing without forwarding the packet. If the hop count is not zero, as determined by decision box 87, box 81 is entered where the hop count 51 in FIG. 5 is decremented by one. Box 88 is then entered to pass the packet over all addressed edges *except* the edge over which the packet arrived. If this protocol is observed at all nodes, the multicast tree packet will be delivered to all multicast tree end nodes and user stations. This process then terminates in stop box 89.

In accordance with the present invention, if the RAMT (Remote Access to Multicast Tree) mode is detected in decision box 73, box 76 is entered to examine the first ANR label in the routing field of FIG. 6. Decision box 77 is then entered to determine if this label is followed by an end-of-field flag. If so, box 84 is entered to change the mode in the first control byte 34 (FIG. 3) from RAMT to MTT (Multicast Tree Transition). Box 91 is then entered to strip the ANR label and the end-of-field flag from the routing field. Box 90 is then entered to transmit the packet on the labeled link identified in box 76. Terminal 89 terminates the process. If no ANR end-of-field flag is found in decision box 77, box 82 is entered to strip away the first label. Box 90 is then entered to transmit the packet on the labeled link. Thereafter, stop box 89 is entered to terminated the process.

If the mode detected in decision box 73 is the MTT (Multicast Tree Transition) mode, box 78 is entered to get the tree address 64 from the routing field of FIG. 6. Note that, after the ANR fields 60-63 are stripped away from the routing field of FIG. 6, the remaining fields 64-66 correspond exactly to the Tree Multicast Mode (TMM) routing field of FIG. 5. In box 85, therefore, the routing mode is changed from Multicast Tree Transition (MTT) to Tree Multicast Mode (TMM) to allow further distribution of the packet under the TMM mode. Decision box 83 is then entered to determine if the hop count has been decremented to zero. If so, an error has occurred and the packet should not be forwarded any further. Terminal box 89 is then entered directly without retransmitting the received packet. If the hop count is not zero, box 80 is entered where the hop count in field 65 is decremented by one. Box 86 is then entered to transmit the received packet on all addressed links, including the link over which the packet was received, if it is part of the addressed multicast tree. Terminal box 89 is then entered to terminate the routing process.

It can be seen that the protocols described in the flowchart of FIG. 8 operate to implement the remote access to multicast trees by utilizing the Automatic Network Routing (ANR) labels in the beginning of the RAMT routing field to route the packet to the link connected to an entry node on the multicast tree. At that point, the routing mode can be changed to the Multicast Tree Transition (MTT) mode to ensure that the packet is fed back through the entry link if the entry link is part of the multicast tree. The Multicast Tree Transition mode is used only for the one tree entry decision point, and the mode is thereafter changed to the Tree Multicast Mode (TMM) before forwarding the packet on the addressed tree links. Further distribution of the packet on the multicast tree takes place using the standard Multicast Tree Mode protocol.

It is also possible to use the end-of-field flag between the ANR routing labels and the multicast tree address as a marker to insure that the packet can be transmitted back over the link on which it arrived, if that link is part of the multicast tree. This alternative embodiment of the present invention is shown in FIG. 9. FIG. 9 is identical to FIG. 8 except for the RAMT mode processing. More particularly, in FIG. 9, box 76 is used to examine the first subfield of the routing field 32 (FIG. 3). In decision box 77, it is tested to see if the first subfield is an end-of-field flag. If not, box 82 is entered to strip the ANR label from the routing field and, in box 90, the packet is launched on the identified link. If the first subfield is an end-of-field flag, as determined by decision box 77, box 84 is entered to strip the end-of-field flag from the routing field and then enter box 78 directly. In box 78, as described in connection with FIG. 8, the tree address is obtained from the routing field. In box 85 the routing mode is changed to Tree Multicast Mode (TMM) and the hop count tested in decision box 83. If the hop count is not zero, box 80 is entered to decrement the hop count and then box 86 is entered to transmit the packet on all links identified by the tree address, including the entry link if that link is identified with the tree address. If the hop count is found to be zero in decision box 83, an error has occurred and the process terminated in box 89. The balance of the flow chart of FIG. 9 is identical to the flow chart of FIG. 8 and will not be further described here.

It should also be clear to those skilled in the art that further embodiments of the present invention may be made by those skilled in the art without departing from the teachings of the present invention.

What is claimed is:

1. A packet transmission system for digital data packets including a header, said system comprising
   a plurality of routing decision points, and
   a plurality of transmission links interconnecting said decision points,
   each of said decision points comprising
   means for receiving a plurality of packets from connected decision points,
   means for transmitting a plurality of packets to connected decision points,
   switching means for selectively transferring packets from said receiving means to said transmitting means, and
   route controlling means for controlling said switching means,
   said route controlling means including means responsive to transmission link labels in a first portion of said header for transmitting the packet on a single one of said transmission links, and responsive to a multicast tree address in a second portion of said header for transmitting the packet on a plurality of said transmission links forming part of said multicast tree,
   said route controlling means further including means for transmitting said packet on the entry transmission link over which it is received when said entry transmission link is included in the same multicast tree as said decision point.

2. The packet transmission system according to claim 1 wherein said route controlling means further comprises
   means responsive to an end-of-field flag in said header for changing the mode of processing said header from an automatic network routing mode to a multicast tree routing mode.

3. The packet transmission system according to claim 1 wherein said route controlling means further comprises
   means for stripping the identification of said entry transmission link from said header at the decision point immediately preceding said entry transmission link.

4. A method for routing packets in a packet transmission system for digital data packets including a header, said method comprising the steps of
   transmitting a packet on a single transmission link in said system in response to link labels in a first portion of said header,
   transmitting a packet on a plurality of said transmission links in said system in response to a multicast tree address in a second portion of said header, and
   transmitting said packet on the entry transmission link over which it is received when said entry transmission link is included in the same multicast tree.

5. The method according to claim 4 wherein said steps of transmitting further comprises the step of
   changing the mode of processing said header from an automatic network routing mode to a multicast tree routing mode in response to an end-of-field flag in said header.

6. The method according to claim 4 further comprising the step of stripping the identification of said entry transmission link from said header prior to entry into said entry transmission link.

7. A packet switching point for a packet transmission system transmitting data packets with headers containing routing labels along transmission links in said system, said packet switching point comprising means responsive to a first portion of said header for forwarding each said packet to a single destination over an entry link to said single destination, means responsive to a second portion of said header for simultaneously forwarding each said packet to a plurality of different destinations, and means for retransmitting said packet on said entry transmission link over which it is received.

8. The packet switching point according to claim 7 further comprising means responsive to a flag in said header for changing the mode of forwarding said packet from a single destination mode to a plurality of different destinations mode.

9. The packet switching point according to claim 7 further comprising means for stripping the label of said entry transmission link from said header prior to launching said packet on said entry transmission link.

10. A method for routing data packets with headers containing routing labels in a packet transmission system having transmission links and packet switching points, said method comprising the steps of forwarding each said packet over one of said transmission links to a single destination in response to a first portion of said header, simultaneously forwarding each said packet to a plurality of different destinations in response to a second portion of said header, and transmitting said packet on said one transmission link over which it is received.

11. The method for routing data packets according to claim 10 further comprising the step of changing the mode of forwarding said packet from a single destination mode to a plurality of different destinations mode in response to a flag in said header.

12. The method for routing data packets according to claim 10 further comprising the step of stripping the label of said entry transmission link from said header prior to launching said packet on said entry transmission link.

* * * * *